May 8, 1923.
R. MALCOM,
EYE PROTECTOR
Filed April 5, 1922
1,454,327
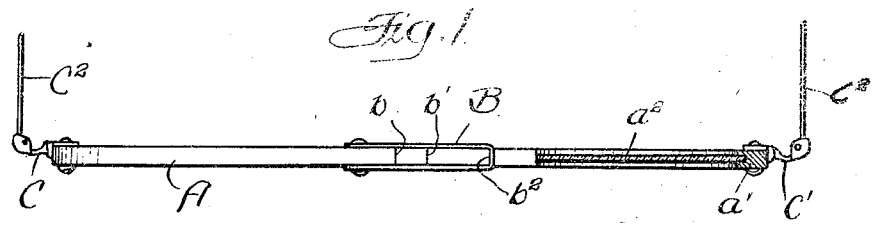
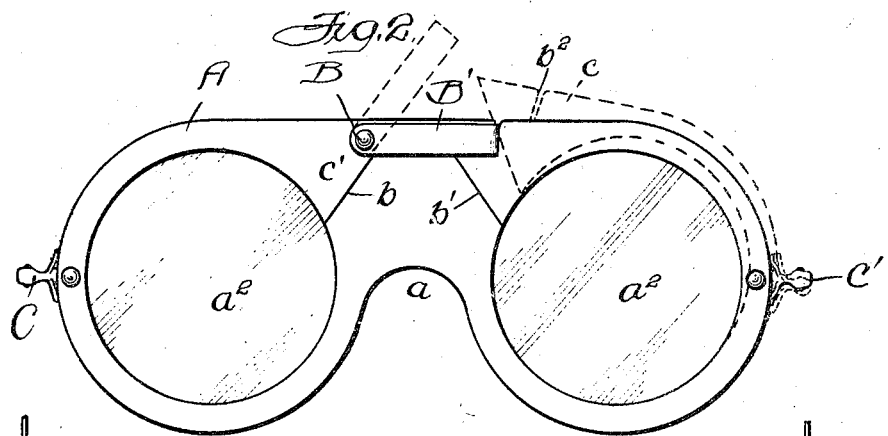
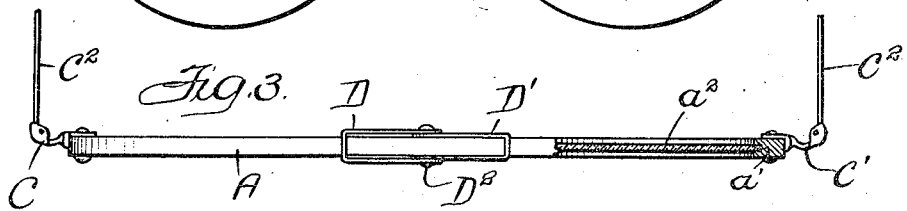
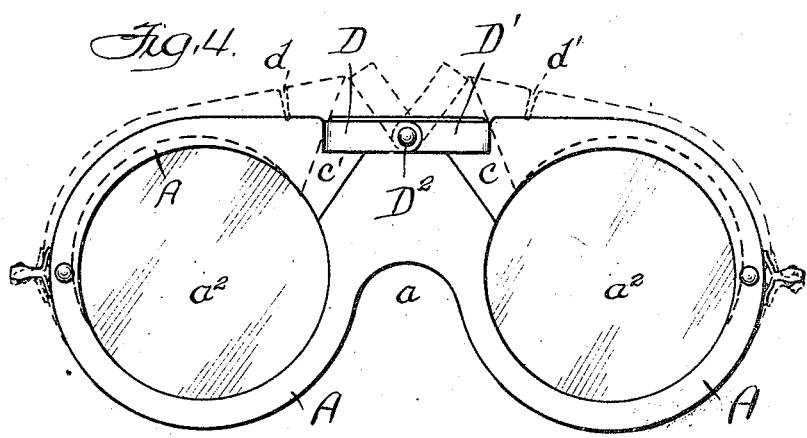
Witness:
W. R. Olson
Inventor:
Robert Malcom
By Bruce Kim, atty Patented May 8, 1923.

1,454,327

UNITED STATES PATENT OFFICE.

ROBERT MALCOM, OF CHICAGO, ILLINOIS.

EYE PROTECTOR.

Application filed April 5, 1922. Serial No. 549,794.

*To all whom it may concern:*

Be it known that I, ROBERT MALCOM, a citizen of the United States, residing in Chicago, Cook County, State of Illinois, have invented certain new and useful Improvements in Eye Protectors, of which the following, taken in connection with the drawings, is a description.

My invention relates to eye protectors which are designed more particularly to be used by workmen in shops or near furnaces, by bicycle riders, automobile drivers and others who are exposed to bright lights, dust or other conditions or elements injurious to the eyes.

One of the objects of my invention is to provide a frame, which may be constructed of fiber or other suitable material, and which contains within the construction thereof means for adjustably securing the lenses and retaining them in position whereby they may be quickly and readily removed and replaced in the event of breakage or for any other reason.

It is also an object of my invention to construct a frame of this kind by means of which either one of the glasses or lenses held in the frame may be removed independently of the other and without disturbing or loosening the lens holding rim of the other lens.

In the accompanying drawings, I have illustrated what I now consider the preferred form of an embodiment of the essential features of my construction, although it will be understood that other modifications may be resorted to without departing from the spirit of my invention, which consists essentially in providing a frame formed of a single piece of material with means for permitting the insertion of a glass or lens in either of the eye openings without interfering with the other, and a reinforcing strip extending across the upper part of the frame which serves also to lock the frame in closed position when the glasses or lenses are in place.

In these drawings:—

Fig. 1 is a top edge view thereof, one end being shown in section,

Fig. 2 is a front elevation of the same, and

Figures 3 and 4 are like edge and front elevation views of a modified form of construction.

The frame A of this goggle or eye protector is preferably formed of a single piece of material such as fiber or the like, which is provided with a recess $a$ in the lower edge thereof to fit over the nose of the wearer. Eye openings are cut through this frame on either side of the recessed portion, each opening being provided with a circumferential channel $a'$ formed therein to receive the glass or lens $a^2$.

The frame A is slit from each of the eye openings to the edge of the frame as at $b-b'$, these slits preferably extending at an angle as shown in Figures 2 and 4. This permits the eye openings to be expanded to receive the lens $a^2$.

The lenses $a^2$, may be either clear or colored transparent material as best suited to the user, and are inserted into the groove or channel $a'$, by springing the outer portion $c-c'$ of the frame A apart as shown in dotted lines in Figures 2 and 4. By springing the frame as shown enlarges the eye opening and permits a lens to be placed in the channel $a'$ formed therein. When the parts of the frame are closed together, the peripheral edge of the glass or lens $a^2$ is held within the channel $a'$ and firmly held in place.

Movably secured as at B to the upper edge of the frame A is a reinforcing locking member B' which forms a loop or link, the ends of which are positioned upon opposite sides of the frame A at the attaching point B. This member is shown in the present instance as attached to the upper edge of the frame, but obviously might be constructed along the locking edge in the recess $a$ as well.

A slot or notch $b^2$ is cut into the edge of the frame at a point coincident with the end of the member B' and receives said member when the lenses have been placed in the eye openings and said locking member is moved into locking position, shown more clearly in Figure 2.

Pivotally attached to the upper ends of the frame A are the hinge members C—C' to which are secured the temples $C^2$, which are preferably the well known form of construction which extend over the ears of the wearer and thereby hold the frame in place upon the face.

In Figures 3 and 4 I have illustrated a modified form of a reinforcing and locking member which takes the form of a double loop D—D', movably or pivotally attached to the center of the frame A as at $D^2$. As previously described the outer free end of each loop member D—D' is received in a notch or slit d—d' cut in the edge of the frame A. In either form of construction when the locking member is raised as shown in dotted lines in Figures 2 or 4, the free ends of the frame c—c' are manually spread apart to remove or replace the glass or lens $a^2$. When the lens is in place in the channel within the eye opening in the frame, the locking member is moved downwardly into the notch in the frame where it is held in place by frictional engagement, holding the slit portions of the frame A firmly together and at the same time forming a reinforcing strip along the upper edge of the frame A.

It will be observed that this form of construction requires no special tools of any kind to effect the engagement of the lens holding rims, it is very easily handled, presents no parts which can be displaced, and is very effective in its operation. The notch engaging the free end of the locking member is constructed to effect a tight gripping engagement with said member whereby it is always maintained in closed position until manually released for the purpose of changing the glasses or lenses.

I claim:—

1. An eye protector formed of a single piece of material having a nose recess cut in the lower edge thereof and openings for the eyes, said frame having a circumferential channel in each eye opening and slits extending from each eye opening to the edge of the frame whereby said eye opening may be expanded to receive lenses in the aforesaid channel, a locking member movably secured to said frame and extending across the slit portions thereof to hold same in closed position.

2. An eye protector frame formed of a single piece of material having eye openings therein and a slit extending from each of the openings to the edge of said frame, a lens seated in a circumferential channel formed in each of the openings, locking means pivotally secured to the upper edge of said frame, said means extending across the slit portions of the frame and being retained by frictional engagement in a notch formed in the edge of said frame.

3. An eye protector formed of a single piece of material having eye openings therein, a slit extending at an angle from each eye opening to the edge of said frame, reinforcing locking means pivotally secured to said frame and extending across the slit portions on each side of said frame, said locking means being frictionally held in engagement with said frame when in closed position.

4. An eye protector frame formed of a single piece of material having eye openings therein and having slits extending from each eye opening to the edge of said frame to permit the expansion thereof for insertion of lenses in said openings, reinforcing locking means pivotally attached to said frame and extending parallel with each side thereof, said locking means having frictional engagement with said frame to close the ends of said frame together and hold the lenses in place.

In testimony whereof I have signed this specification.

ROBERT MALCOM.